(12) United States Patent
Pulipati et al.

(10) Patent No.: US 11,924,918 B2
(45) Date of Patent: Mar. 5, 2024

(54) ENHANCEMENTS TO SHARED DATA

(71) Applicant: NOKIA TECHNOLOGIES OY, Espoo (FI)

(72) Inventors: Narasimha Rao Pulipati, Bangalore (IN); Ulrich Wiehe, Bad Hersfeld (DE); Saurabh Khare, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/391,211

(22) Filed: Aug. 2, 2021

(65) Prior Publication Data

US 2022/0053319 A1   Feb. 17, 2022

(30) Foreign Application Priority Data

Aug. 11, 2020   (IN) .............................. 202041034455

(51) Int. Cl.
| | |
|---|---|
| H04W 8/20 | (2009.01) |
| H04W 8/08 | (2009.01) |
| H04W 8/30 | (2009.01) |
| H04W 24/04 | (2009.01) |

(52) U.S. Cl.
CPC ............. *H04W 8/205* (2013.01); *H04W 8/08* (2013.01); *H04W 8/30* (2013.01); *H04W 24/04* (2013.01)

(58) Field of Classification Search
CPC ......... H04W 8/205; H04W 8/08; H04W 8/30; H04W 24/04
USPC ................ 455/435.1, 432.1, 418, 422.1, 423
See application file for complete search history.

(56) References Cited

U.S. PATENT DOCUMENTS

| | | | | |
|---|---|---|---|---|
| 2016/0203054 | A1* | 7/2016 | Zhang ................. | G06F 11/1469 707/645 |
| 2017/0332421 | A1 | 11/2017 | Sternberg et al. | |
| 2019/0191467 | A1 | 6/2019 | Dao et al. | |
| 2019/0230556 | A1 | 7/2019 | Lee | |
| 2020/0029388 | A1 | 1/2020 | Dao et al. | |

FOREIGN PATENT DOCUMENTS

EP   3 618 517 A1   3/2020

OTHER PUBLICATIONS

3GPP TS 29.503 V16.3.0 (Mar. 2020), Technical Specification, 3rd Generation Partnership Project; Technical Specification Group Core Network and Terminals; 5G System; Unified Data Management Services; Stage 3 (Release 16), Mar. 30, 2020.

(Continued)

*Primary Examiner* — Nghi H Ly
(74) *Attorney, Agent, or Firm* — SQUIRE PATTON BOGGS (US) LLP

(57) ABSTRACT

Systems, methods, apparatuses, and computer program products for enhancing shared data in a communications system are provided. One method may include receiving or retrieving, at a service consumer, shared data from a service producer. The shared data may include at least one treatment attribute configured to indicate a treatment of at least one attribute in the shared data with respect to at least one attribute in individual subscriber data. The method may also include applying a value provided in the at least one shared data attribute or a value provided in the at least one individual subscriber data attribute based on the at least one treatment attribute.

16 Claims, 7 Drawing Sheets

(56) References Cited

OTHER PUBLICATIONS

Orange, "Client patches individual resource with shared ones", 3GPP Draft, C4-187220, 3rd Generation Partnership Project (3GPP), 3GPP TSG-CT4 Meeting #86, Oct. 5, 2018.
Nokia et al., "Shared Data", 3GPP Draft, 3rd Generation Partnership Project (3GPP), C4-186497, 3GPP TSG CT WG4 Meeting #86, Aug. 31, 2018.
Extended European Search Report issued in corresponding European Patent Application No. 21187400.3 dated Jan. 5, 2022.

* cited by examiner

```
TreatmentInstruction:
anyOf:
- type: string
  enum:
  - USE_IF_NO_CLASH (individual data attribute takes precedence; default)
  - OVERWRITE (shared data attribute takes precedence)
  - MAX (the higher value shall be used)
  - MIN (the lower value shall be used)
- type: string
```

Fig. 2

305
Subscriber Data

Resource AccessAndMobilitySubscriptionData:
{
..
"subscribedUeAmbr": {
  "uplink": 20Mbps,
  "downlink": 50Mbps
},
sharedAmDataIds: ambrData
}

310
Shared-Data

Shared Id ambrData:
{
"subscribedUeAmbr": {
    "uplink": 50Mbps,
    "uplinkTreatment": OVERWRITE
    "downlink": 100Mbps,
    "downlinkTreatment": OVERWRITE
    }
}

315
Aggregated Data or final profile after applying the rules:

AccessAndMobilitySubscriptionData:
{
..
"subscribedUeAmbr": {
  "uplink": 50Mbps,
  "downlink": 100Mbps
}
}

Fig. 3

ENHANCEMENTS TO SHARED DATA

CROSS REFERENCE TO RELATED APPLICATION

This application claims the benefit of Indian Provisional Application No. 202041034455, filed Aug. 11, 2020. The entire content of the above-referenced application is hereby incorporated by reference.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for enhancing shared data in such communications systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An example embodiment is directed to a method that may include receiving or retrieving, at a service consumer, shared data from a service producer. The shared data comprises at least one treatment attribute configured to indicate a treatment of at least one attribute in the shared data over at least one attribute in individual subscriber data. The method may also include applying a value provided in the at least one shared data attribute or a value provided in the at least one individual subscriber data attribute based on the at least one treatment attribute.

In the method according to the example embodiment, the shared data may comprise at least one treatment attribute indicating how a potential conflict between individual subscriber data and shared data will be treated.

The shared data may also comprise a single treatment attribute as a map comprising key and treatment value pairs.

The at least one treatment attribute may indicate at least one of: overwrite the at least one individual subscriber data attribute with the at least one shared data attribute; use the at least one shared subscriber data attribute unless it clashes with the at least one individual data attribute; select a maximum value between the at least one individual subscriber data attribute and the at least one shared data attribute; or select a minimum value between the at least one individual subscriber data attribute and the at least one shared data attribute.

In certain embodiments, the individual subscriber data may comprise at least one treatment attribute, wherein the at least one treatment attribute in the individual subscriber data is configured to indicate a treatment of the at least one attribute in the shared data over the at least one attribute in the individual subscriber data.

In certain embodiments, when a plurality of shared data is configured, the at least one treatment attribute may be configured to be applied to all of the plurality of shared data.

In certain embodiments, the at least one conflicting attribute in the individual subscriber data may take precedence over the at least one attribute in the shared data unless the at least one treatment attribute indicates otherwise.

In some embodiments the service consumer may comprise at least one of an access and mobility management function (AMF), session management function (SMF), short message service function (SMSF), or other network entity or function. The service producer may comprise at least one of a unified data manager (UDM) or unified data repository (UDR).

Another example embodiment is directed to a method that may include providing, from a service producer, shared data to a service consumer. The shared data comprises at least one treatment attribute configured to indicate a treatment of at least one attribute in the shared data over at least one attribute in individual subscriber data.

The shared data may comprise at least one treatment attribute indicating how a potential conflict between individual subscriber data and shared data will be treated.

The shared data may comprise a single treatment attribute as a map comprising key and treatment value pairs.

In some embodiments the at least one treatment attribute may indicate at least one of: overwrite the at least one individual subscriber data attribute with the at least one shared data attribute; use the at least one shared subscriber data attribute unless it clashes with the at least one individual data attribute; select a maximum value between the at least one individual subscriber data attribute and the at least one shared data attribute; or select a minimum value between the at least one individual subscriber data attribute and the at least one shared data attribute.

In certain embodiments the individual subscriber data may comprise at least one treatment attribute, wherein the at least one treatment attribute in the individual subscriber data is configured to indicate whether the at least one attribute in the shared data should be applied over the at least one conflicting attribute in the individual subscriber data.

In some embodiments when a plurality of shared data is configured, the at least one treatment attribute may be configured to be applied to all of the plurality of shared data.

In some embodiments the at least one conflicting attribute in the individual subscriber data may take precedence over the at least one attribute in the shared data unless the at least one treatment attribute indicates otherwise.

In certain embodiments the service consumer may comprise at least one of an access and mobility management function (AMF) or session management function (SMF), short message service function (SMSF), or other network entity or function. The service producer may comprise at least one of a unified data manager (UDM) or unified data repository (UDR).

Another example embodiment is directed to a method that may include receiving or retrieving, at a service consumer, individual subscriber data from a service producer, and receiving or retrieving, at the service consumer, shared data from the service producer. The individual subscriber data and/or the shared data comprises at least one treatment attribute configured to indicate a treatment of at least one attribute in the shared data over the at least one attribute in the individual subscriber data. The method may also include applying a value provided in the at least one shared data attribute or a value provided in the at least one individual subscriber data attribute based on the at least one treatment attribute in the individual subscriber data and/or in the shared data.

Another example embodiment is directed to an apparatus that may include at least one processor and at least one memory comprising computer program code. The at least one memory and computer program code configured, with the at least one processor, to cause the apparatus at least to receive or retrieve shared data from a service producer. The shared data comprises at least one treatment attribute configured to indicate a treatment of at least one attribute in the shared data over at least one attribute in individual subscriber data. The at least one memory and computer program code configured, with the at least one processor, to cause the apparatus at least to apply, based on the at least one treatment attribute, a value provided in the at least one shared data attribute or a value provided in the at least one individual subscriber data attribute.

The shared data may comprise at least one treatment attribute indicating how a potential conflict between individual subscriber data and shared data will be treated.

The shared data may also comprise a single treatment attribute as a map comprising key and treatment value pairs.

The at least one treatment attribute may indicates at least one of: overwrite the at least one individual subscriber data attribute with the at least one shared data attribute; use the at least one shared subscriber data attribute unless it clashes with the at least one individual data attribute; select a maximum value between the at least one individual subscriber data attribute and the at least one shared data attribute; or select a minimum value between the at least one individual subscriber data attribute and the at least one shared data attribute.

In some embodiments the individual subscriber data may comprise at least one treatment attribute, wherein the at least one treatment attribute in the individual subscriber data is configured to indicate a treatment of the at least one attribute in the shared data over the at least one attribute in the individual subscriber data.

In some embodiments, when a plurality of shared data is configured, the at least one treatment attribute may be configured to be applied to all of the plurality of shared data.

In some embodiments the at least one conflicting attribute in the individual subscriber data may take precedence over the at least one attribute in the shared data unless the at least one treatment attribute indicates otherwise.

In some embodiments the apparatus may comprise at least one of an access and mobility management function (AMF), session management function (SMF), short message service function (SMSF), or other network entity or function. The service producer may comprise at least one of: a unified data manager (UDM) or unified data repository (UDR).

Another example embodiment is directed to an apparatus that may include at least one processor and at least one memory comprising computer program code. The at least one memory and computer program code configured, with the at least one processor, to cause the apparatus at least to provide shared data to a service consumer. The shared data comprises at least one treatment attribute configured to indicate a treatment of at least one attribute in the shared data over at least one attribute in individual subscriber data.

The shared data may comprise at least one treatment attribute indicating how a potential conflict between individual subscriber data and shared data will be treated.

The shared data may also comprise a single treatment attribute as a map comprising key and treatment value pairs.

In some embodiments the at least one treatment attribute indicates at least one of: to overwrite the at least one individual subscriber data attribute with the at least one shared data attribute; to use the at least one shared subscriber data attribute unless it clashes with the at least one individual data attribute; to select a maximum value between the at least one individual subscriber data attribute and the at least one shared data attribute; or to select a minimum value between the at least one individual subscriber data attribute and the at least one shared data attribute.

In certain embodiments the individual subscriber data may comprise at least one treatment attribute, wherein the at least one treatment attribute in the individual subscriber data is configured to indicate a treatment of the at least one attribute in the shared data over the at least one attribute in the individual subscriber data.

In certain embodiments when a plurality of shared data is configured, the at least one treatment attribute may be configured to be applied to all of the plurality of shared data.

In some embodiments the at least one conflicting attribute in the individual subscriber data may take precedence over the at least one attribute in the shared data unless the at least one treatment attribute indicates otherwise.

In some embodiments the service consumer may comprise at least one of: an access and mobility management function (AMF), session management function (SMF), short message service function (SMSF), or other network entity or function. The apparatus may comprise at least one of a unified data manager (UDM) or unified data repository (UDR).

Another example embodiment is directed to an apparatus that may include at least one processor and at least one memory comprising computer program code. The at least one memory and computer program code configured, with the at least one processor, to cause the apparatus at least to receive or retrieve individual subscriber data from a service producer, and to receive or retrieve shared data from the service producer. The individual subscriber data and/or the shared data comprises at least one treatment attribute configured to indicate a treatment of at least one attribute in the shared data over the at least one attribute in the individual subscriber data. The at least one memory and computer program code configured, with the at least one processor, to cause the apparatus at least to apply a value provided in the at least one shared data attribute or a value provided in the at least one individual subscriber data attribute based on the at least one treatment attribute in the individual subscriber data and/or in the shared data.

Another example embodiment is directed to an apparatus that may include means for receiving or retrieving shared data from a service producer. The shared data comprises at least one treatment attribute configured to indicate a treatment of at least one attribute in the shared data over at least one attribute in individual subscriber data. The apparatus may also include means for applying, based on the at least one treatment attribute, a value provided in the at least one shared data attribute or a value provided in the at least one individual subscriber data attribute.

The shared data may comprise at least one treatment attribute indicating how a potential conflict between individual subscriber data and shared data will be treated.

The shared data may also comprise a single treatment attribute as a map comprising key and treatment value pairs.

In some embodiments the at least one treatment attribute indicates at least one of: to overwrite the at least one individual subscriber data attribute with the at least one shared data attribute; to use the at least one shared subscriber data attribute unless it clashes with the at least one individual data attribute; to select a maximum value between the at least one individual subscriber data attribute and the at least one shared data attribute; or to select a minimum value between the at least one individual subscriber data attribute and the at least one shared data attribute.

In some embodiments the individual subscriber data may comprise at least one treatment attribute, wherein the at least one treatment attribute in the individual subscriber data is configured to indicate a treatment of the at least one attribute in the shared data over the at least one attribute in the individual subscriber data.

In some embodiments when a plurality of shared data is configured, the at least one treatment attribute may be configured to be applied to all of the plurality of shared data.

In some embodiments the at least one conflicting attribute in the individual subscriber data may take precedence over the at least one attribute in the shared data unless the at least one treatment attribute indicates otherwise.

According to the another example the apparatus may comprise at least one of an access and mobility management function (AMF) or session management function (SMF), and wherein the service producer comprises at least one of a unified data manager (UDM) or unified data repository (UDR).

Another example embodiment is directed to an apparatus that may include means for providing shared data to a service consumer. The shared data comprises at least one treatment attribute configured to indicate a treatment of at least one attribute in the shared data over at least one attribute in individual subscriber data.

The shared data may comprise at least one treatment attribute indicating how a potential conflict between individual subscriber data and shared data will be treated.

The shared data may also comprise a single treatment attribute as a map comprising key and treatment value pairs.

In some embodiments at least one treatment attribute indicates at least one of: to overwrite the at least one individual subscriber data attribute with the at least one shared data attribute; to use the at least one shared 1 subscriber data attribute unless it clashes with the at least one individual data attribute; to select a maximum value between the at least one individual subscriber data attribute and the at least one shared data attribute; or to select a minimum value between the at least one individual subscriber data attribute and the at least one shared data attribute.

In some embodiments the individual subscriber data may comprise at least one treatment attribute, wherein the at least one treatment attribute in the individual subscriber data is configured to indicate a treatment of the at least one attribute in the shared data over the at least one attribute in the individual subscriber data.

In some embodiments when a plurality of shared data is configured, the at least one treatment attribute may be configured to be applied to all of the plurality of shared data.

In certain embodiments the at least one conflicting attribute in the individual subscriber data may take precedence over the at least one attribute in the shared data unless the at least one treatment attribute indicates otherwise.

In certain embodiments the service consumer may comprise at least one of an access and mobility management function (AMF) or session management function (SMF), and wherein the apparatus comprises at least one of a unified data manager (UDM) or unified data repository (UDR).

Another example embodiment is directed to an apparatus that may include means for receiving or retrieving individual subscriber data from a service producer, and means for receiving or retrieving shared data from the service producer. The individual subscriber data and/or the shared data comprises at least one treatment attribute configured to indicate a treatment of at least one attribute in the shared data over the at least one attribute in the individual subscriber data. The apparatus may also include means for applying a value provided in the at least one shared data attribute or a value provided in the at least one individual subscriber data attribute based on the at least one treatment attribute provided in the individual subscriber data and/or in the shared data.

Another example embodiment is directed to a method that may include receiving or retrieving, at a service consumer, shared data from a service producer. The shared data comprises at least one treatment attribute configured to indicate a treatment of at least one attribute in the shared data over at least one attribute in individual subscriber data. The individual subscriber data comprises at least one treatment attribute configured to indicate a treatment of the at least one attribute in the shared data over the at least one attribute in the individual subscriber data. The method may also include applying a value provided in the at least one shared data attribute or a value provided in the at least one individual subscriber data attribute based on at least one of the at least one treatment attribute in the shared data or the at least one treatment attribute in the individual subscriber data.

When the at least one treatment attribute in the shared data conflicts with the at least one treatment attribute in the individual subscriber data, the at least one treatment attribute in the individual subscriber data takes precedence, and the applying comprises applying the value provided in the at least one individual subscriber data attribute.

Another example embodiment is directed to an apparatus, comprising at least one processor and at least one memory comprising computer program code. The at least one memory and computer program code is configured, with the at least one processor, to cause the apparatus at least to receive or retrieve, at a service consumer, shared data from a service producer. The shared data may comprise at least one treatment attribute configured to indicate a treatment of at least one attribute in the shared data over at least one attribute in individual subscriber data. The individual subscriber data may comprise at least one treatment attribute configured to indicate a treatment of the at least one attribute in the shared data over the at least one attribute in the individual subscriber data. The at least one memory and computer program code may be further configured, with the at least one processor, to cause the apparatus to apply a value provided in the at least one shared data attribute or a value provided in the at least one individual subscriber data attribute based on at least one of the at least one treatment attribute in the shared data or the at least one treatment attribute in the individual subscriber data.

When the at least one treatment attribute in the shared data conflicts with the at least one treatment attribute in the individual subscriber data, the at least one treatment attribute in the individual subscriber data takes precedence, and the at least one memory and computer program code configured, with the at least one processor, to cause the apparatus at least to apply the value provided in the at least one individual subscriber data attribute.

Another example embodiment is directed to an apparatus, comprising means for receiving or retrieving, at a service consumer, shared data from a service producer, wherein the shared data comprises at least one treatment attribute configured to indicate a treatment of at least one attribute in the shared data over at least one attribute in individual subscriber data, wherein the individual subscriber data comprises at least one treatment attribute configured to indicate a treatment of the at least one attribute in the shared data over the at least one attribute in the individual subscriber data. The apparatus may further include means for applying a value provided in the at least one shared data attribute or a value provided in the at least one individual subscriber data attribute based on at least one of the at least one treatment attribute in the shared data or the at least one treatment attribute in the individual subscriber data.

When the at least one treatment attribute in the shared data conflicts with the at least one treatment attribute in the individual subscriber data, the at least one treatment attribute in the individual subscriber data takes precedence, and the means for applying comprises means for applying the value provided in the at least one individual subscriber data attribute.

Another example embodiment is directed to a computer readable medium comprising program instructions stored thereon for performing at least the method according any of the method example embodiments described above.

BRIEF DESCRIPTION OF THE DRAWINGS

For proper understanding of example embodiments, reference should be made to the accompanying drawings, wherein.

FIG. 2 illustrates an example structure of a treatment attribute, according to one example embodiment;

FIG. 3 illustrates one example applying an embodiment to a subscription data resource and attribute, according to an embodiment;

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for enhancing shared data in a communications system, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

In 5G, unified data management (UDM) manages network user data in a centralized element. UDM can be paired with a user data repository (UDR) that can store user information, such as customer subscription information, customer authentication information, and/or security credentials.

Figure 1:
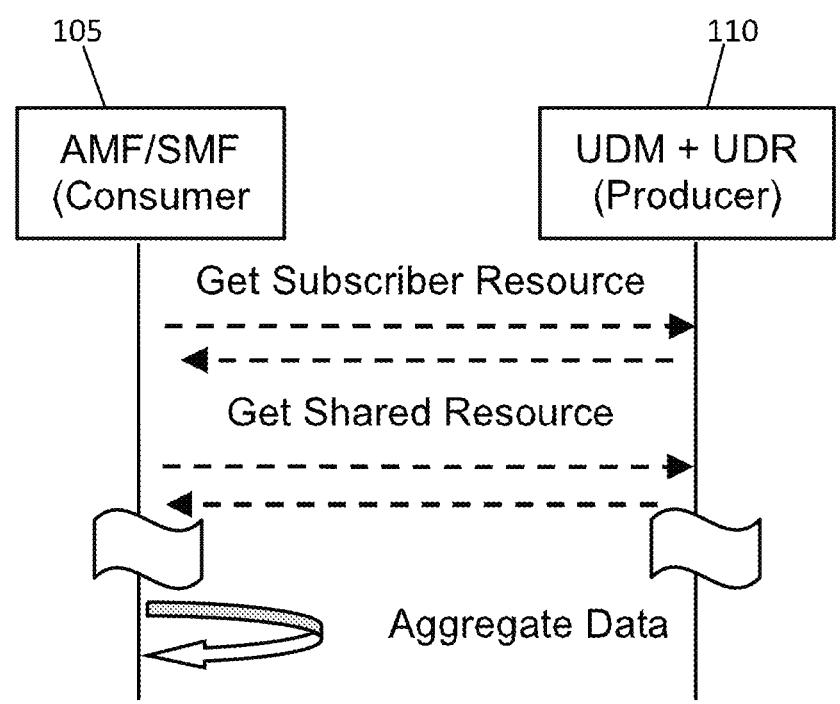
FIG. 1 illustrates an example signaling flow diagram of subscription data management, according to one example.

The shared data feature allows optimized handling of subscription data shared by multiple UEs. For example, the shared data feature may help to reduce subscriber profile size that is stored in the UDR by separating common data attributes from the individual subscriber profiles and store them in the shared profiles. FIG. 1 illustrates an example signaling flow diagram of subscription data management between a NF service consumer 105, such as an access and mobility function (AMF) or session management function (SMF), and a NF service producer 110, such as a UDM/UDR. In the example of FIG. 1, the NF service consumer 105 may send a request for an individual subscriber resource towards the NF service producer 110, and may receive the requested subscriber resource from the NF service producer 110. The received individual subscriber resource may contain an indication indicating that, in addition to the individual subscriber resource, also a shared resource is applicable. If so, as also illustrated in the example of FIG. 1, the NF service consumer 105 may also send a request for shared resource towards the NF service producer 110, which stores the shared subscription data. The NF service consumer 105 may then receive the requested shared subscription data from the NF service producer 110.

Currently, when shared data clash with individual data, it has been specified that individual data should take preference. For example, if an individual subscriber data attribute and shared data attributes are configured in a resource, then precedence is given to the individual subscriber data. However, this predefined preference for individual data limits the flexibility that could be achieved by the shared data concept. There is no current mechanism available where a certain attribute from shared data can be selected even if the individual subscriber attribute is configured. To do so, the operator must delete the individual subscriber profile, which is a heavy provisioning operation. If, later, these values are required for individual subscriber profile, then those values would need to be provisioned again.

Another issue is that, if both the 'individual subscriber attribute in the resource' and the 'sharedData and corresponding attribute' are configured for a resource, then there is no framework available where, based on comparing the value of the both attributes, a final value can be selected. As one example, there is currently no mechanism for allowing the maximum value between the individual profile attribute and shared data attribute may be used, or the minimum value between the individual profile attribute and shared data attribute may be used. More generally, there is currently no method available to select the attribute from individual profile or shared profile dynamically without updating individual subscriber profiles. Example embodiments described herein provide solutions for at least these problems, as well as others.

As discussed below, example embodiments may be directed to extending the shared data feature by adding treatment instructions to the shared data indicating how the shared data attributes should be treated. The treatment instruction may, for example, indicate that individual data take precedence (e.g., as default) or that shared data take precedence. Therefore, certain embodiments, provide a method to enhance the shared profile/data with the additional capability to select an attribute from the individual profile or shared data, based on certain conditions defined in the shared data.

In general, the subscriber attribute may be configured in an individual profile, in a shared profile, or in both. However, there is currently no attribute level control in a shared profile to select which attribute is applicable. Therefore, certain example embodiments provide enhancements to the existing shared data to provide attribute level control in a shared profile in order to be able to select which attribute is applicable.

According to one example embodiment, an attribute that defines a treatment for one or more shared data attributes can be included in shared data. In certain example embodiments, when a subscriber profile attribute should be suppressed or precedence given to shared profile attribute, the treatment can be added in the shared profile for that attribute.

Additionally or alternatively, in an example embodiment, rather than having a new attribute specified for each attribute already defined, a single attribute (e.g., type map) can be added to a shared data record data structures that is a map of attribute as key and treatment value pairs.

FIG. 2 illustrates an example structure of a treatment attribute, according to one example embodiment. As illustrated in the example of FIG. 2, a treatment indicating OVERWRITE" specifies to aggregate individual profile data with shared data so that the attribute of the individual profile is not used and so that the attribute of the shared data if present is used, "USE_IF_NO_CLASH" specifies to aggregate individual profile data with shared data so that the attribute of the individual data if present takes precedence, "MAX" specifies that the maximum value between the individual profile attribute and the shared data attribute is to be used, and "MIN" specifies that the minimum value between the individual profile attribute and the shared data attribute is to be used.

FIG. 3 illustrates one example applying an embodiment to an Access And Mobility Subscription Data resource and UE Ambr attribute. As illustrated in the example of FIG. 3, the individual subscriber data 305 includes the AccessAndMobilitySubscriptionData resource with UeAmbr attribute indicating uplink of 20 Mbps and downlink of 50 Mbps. As also illustrated in the example of FIG. 3, the shared data 310 includes UeAmbr attribute indicating uplink of 50 Mbps and downlink of 100 Mbps. However, the shared data 310 also includes an uplink treatment attribute indicating "OVERWRITE" and downlink treatment attribute indicating "OVERWRITE." Hence, the treatment attributes in the shared data 310 indicate to update the individual subscriber data with the shared data attribute. In other words, in the example of FIG. 3, the shared data attributes overwrite the corresponding data attributes in the individual subscriber data 305. The example of FIG. 3 further illustrates the resulting aggregated data or final profile 315 showing that the UEAmbr attribute uses the uplink and downlink from the shared data 310. It is noted that FIG. 3 depicts just one possible example for purposes of illustration, as example embodiments are not limited to this example.

Figure 4:
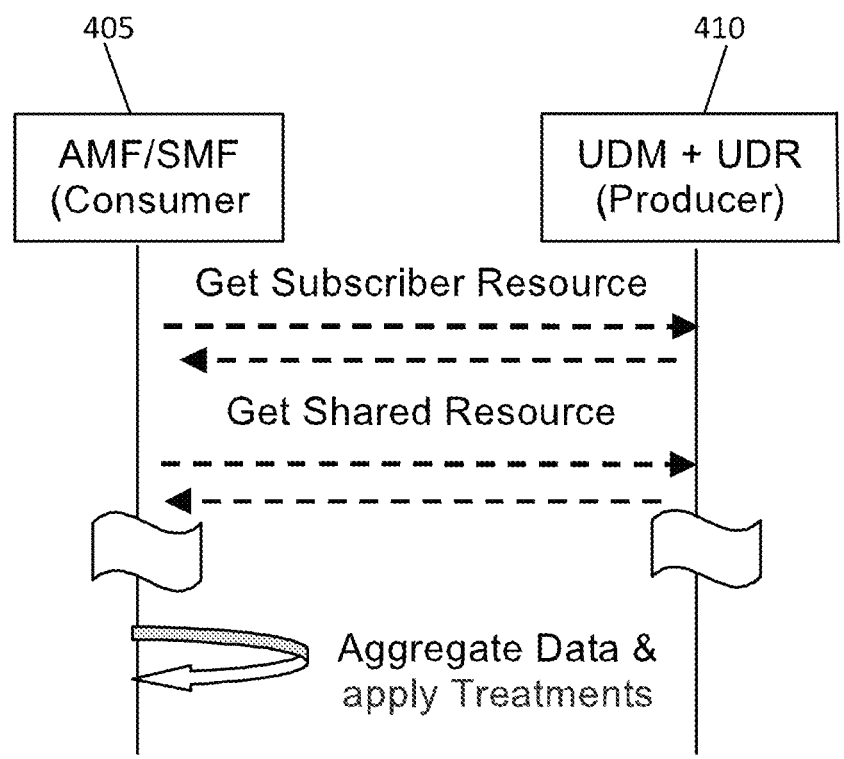
FIG. 4 illustrates an example signaling flow diagram of subscription data management, according to an embodiment.

FIG. 4 illustrates an example signaling flow diagram of subscription data management between a NF service consumer 405 and a NF service producer 410, according to certain example embodiments. As mentioned above, the NF service consumer 405 may include an access and mobility function (AMF) and/or session management function (SMF), and the NF service producer 410 may include a UDM and/or UDR. In the example of FIG. 4, the NF service consumer 405 may send a request for individual subscriber data (Get Subscriber Resource) towards the NF service producer 410, and may receive the requested individual subscriber data from the NF service producer 410. As also illustrated in the example of FIG. 4, the NF service consumer 405 may also send a request for shared resource (Get Shared Resource) towards the NF service producer 410, which stores the shared subscription data. The NF service producer 410 may then provide the requested shared subscription data to the NF service consumer 405.

In an embodiment, the shared subscription data may include one or more treatment attributes that define or indicate whether a shared data attribute takes precedence over a subscriber resource attribute. According to one example embodiment, the service consumer 405 may then use the treatment attribute(s) to determine whether to apply the value provided in the shared data attribute or the value provided in the subscriber resource attribute. Therefore, as a result of the inclusion of the treatment attribute(s), the service consumer 405 knows how to consume the final aggregated data, without modifying individual subscriber data.

According to a further embodiment, the treatment attribute can be the part of the individual subscriber data attribute level. In this embodiment, the individual profile treatment may decide which value to select from between the shared data value or individual profile attribute value. In an example embodiment, if there are multiple shared data configured, then this treatment attribute can be applied to all the shared data configured.

Additionally, according to some example embodiments, the above-described embodiments can be combined or used together, i.e., a treatment attribute can be included in the shared data and in the individual subscriber data. Such an embodiment may offer some additional flexibility, so that per-subscriber treatment can be used in conjunction with per shared data record treatment. When both are used, the precedence of or interactions between the treatments when there is a conflict between the treatment in subscriber data and shared data records can be defined. For example, it may be defined that the individual subscriber treatment takes precedence over the shared data treatment or vice versa.

Figure 5:
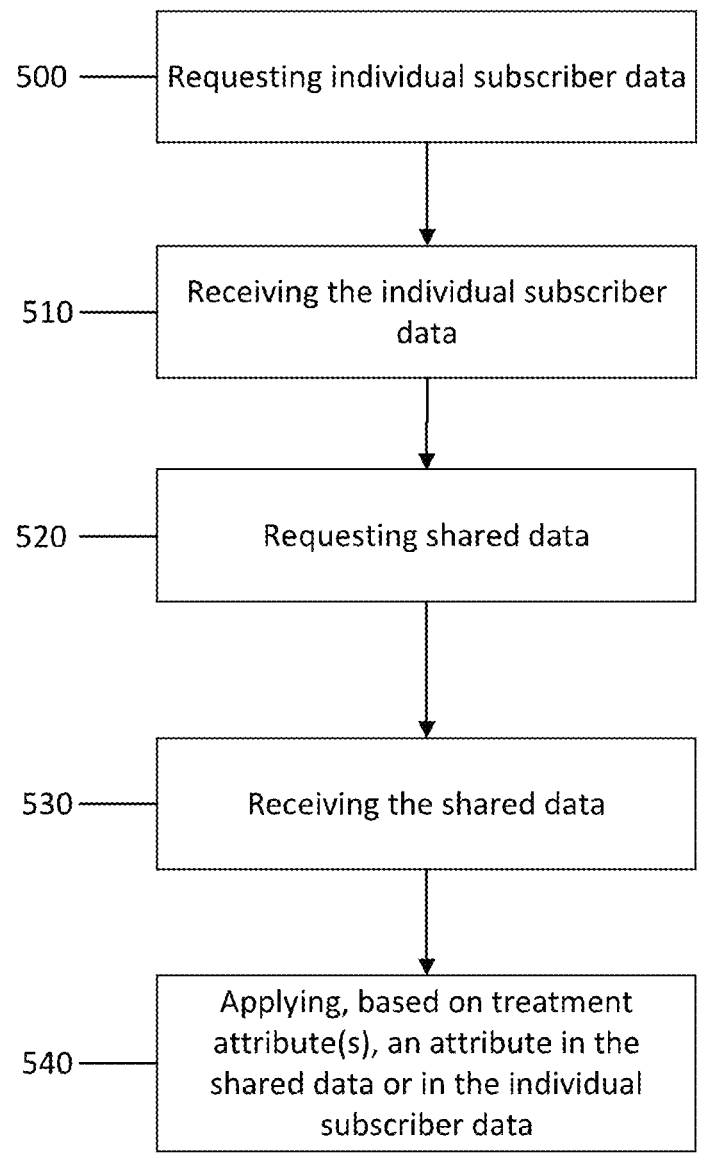
FIG. 5 illustrates an example flow diagram of a method, according to an embodiment.

FIG. 5 illustrates an example flow diagram of a method of subscription data management by enhancing shared data, according to one example embodiment. In certain example embodiments, the flow diagram of FIG. 5 may be performed by a network entity or network node in a communications system, such as LTE or 5G NR. In some example embodiments, the network entity performing the method of FIG. 5 may include a service consumer, such as an AMF or SMF, or the like. For instance, in one example embodiment, the method of FIG. 5 may be performed by an AMF or SMF, such as the AMF/SMF depicted in the example diagrams of FIG. 1 or 4.

In an example embodiment, as illustrated in the example of FIG. 5, a method may optionally include, at 500, requesting individual subscriber data from a service producer and, at 510, receiving or retrieving the individual subscriber data from the service producer. For example, in some embodiments, the service producer may include a UDM and/or UDR. According to certain example embodiments, the method may also include, at 520, requesting shared data from the service producer and, at 530, receiving or retrieving the shared data from the service producer. In some example embodiments, the shared data may include one or more treatment attributes configured to define or indicate a treatment of one or more attributes in the shared data with respect to one or more attributes in the individual subscriber data. As an example, the treatment attribute may be configured to indicate whether one or more attributes in the shared data should be applied or utilized over one or more attributes in the individual subscriber data. According to a further example embodiment, the individual subscriber data may additionally or alternatively include one or more treatment attributes configured to define or indicate a treatment of an attribute in the shared data over an attribute in the individual subscriber data. For instance, the treatment attribute(s) in the shared data and/or in the individual data may indicate how a potential conflict between individual data and shared data should be treated, e.g. the treatment attribute may indicate the treatment of a potential conflict between individual data and shared data. In other words, the treatment attribute(s) may indicate whether a value provided by a shared data attribute takes precedence over a value provided by a corresponding individual subscriber data attribute that may conflict with the shared data attribute. According to an example embodiment, the method of FIG. 5 may include, at 540, applying, based on the treatment attribute(s), a value provided in the shared data attribute or a value provided in the individual subscriber data attribute. This may be done in certain example embodiments by determining, using the treatment attribute, whether to apply a value provided in the shared data attribute or a value provided in the individual subscriber data attribute. In certain example embodiments, the method may also include aggregating data according to the determination of whether to apply the value provided in the shared data attribute or the value provided in the individual subscriber data attribute.

Figure 6:
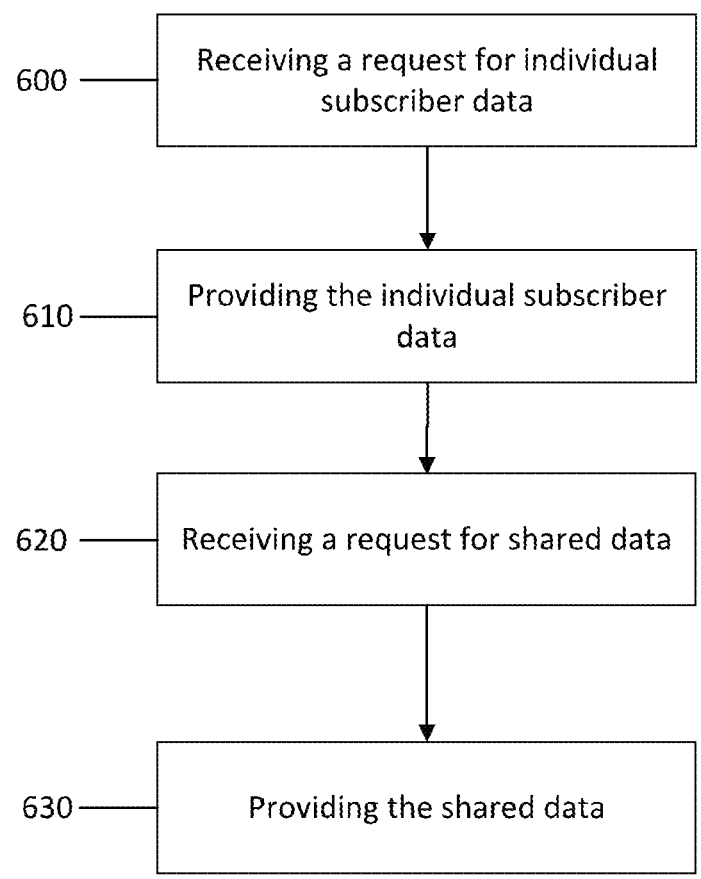
FIG. 6 illustrates an example flow diagram of a method, according to an embodiment.

FIG. 6 illustrates an example flow diagram of a method of subscription data management by enhancing shared data, according to one example embodiment. In certain example embodiments, the flow diagram of FIG. 6 may be performed by a network entity or network node in a communications system, such as LTE or 5G NR. In some example embodiments, the network entity performing the method of FIG. 6 may include a service producer, such as an UDM or UDR, or the like. For instance, in one example embodiment, the method of FIG. 6 may be performed by a UDM or UDR, such as the UDM/UDR depicted in the example diagrams of FIG. 1 or 4.

In an example embodiment, as illustrated in the example of FIG. 6, a method may optionally include, at 600, receiving a request for individual subscriber data from a service consumer and, at 610, providing or transmitting the individual subscriber data to the service consumer. For example, in some embodiments, the service consumer may include an AMF and/or SMF. According to certain example embodiments, the method may also include, at 620, receiving a request for shared data from the service consumer and, at 630, providing or transmitting the shared data to the service consumer. In some example embodiments, the shared data may include one or more treatment attributes configured to define or indicate a treatment of one or more attributes in the shared data with respect to one or more attributes in the individual subscriber data. According to a further example embodiment, the individual subscriber data may additionally or alternatively include one or more treatment attributes configured to define or indicate a treatment of an attribute in the shared data over an attribute in the individual subscriber data. In other words, the treatment attribute(s) may indicate whether a value provided by a shared data attribute takes precedence over a value provided by a corresponding individual subscriber data attribute that may conflict with the shared data attribute. According to an example embodiment, the service consumer may then apply, based on the treatment attribute(s), a value provided in the shared data attribute or a value provided in the individual subscriber data attribute.

In some example embodiments, the shared data may include a treatment attribute provided for each attribute in the shared data. In a further example embodiment, the shared data may include a single treatment attribute as a map that includes, for example, key and treatment value pairs.

According to some example embodiments, the treatment attribute(s) may indicate to suppress the at least one individual subscriber data attribute in favor of the at least one shared data attribute, to overwrite the at least one individual subscriber data attribute with the at least one shared data attribute, to update the at least one individual subscriber data attribute with the at least one shared data attribute, to select a maximum value between the at least one individual subscriber data attribute and the at least one shared data attribute, and/or to select a minimum value between the at least one individual subscriber data attribute and the at least one shared data attribute.

In one example embodiment, when a plurality of shared data is configured, the treatment attribute(s) may be configured to be applied to all of the plurality of shared data. According to an example embodiment, a conflicting attribute in the individual subscriber data takes precedence over the attribute in the shared data unless the treatment attribute(s) indicate otherwise.

Figure 7A:
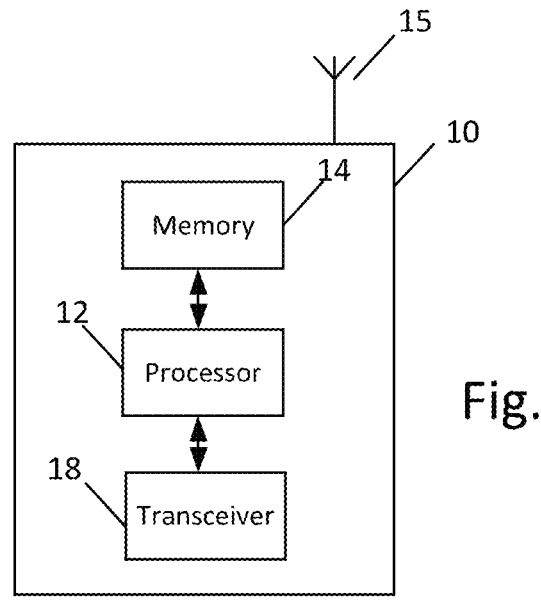
FIG. 7a illustrates an example block diagram of an apparatus, according to an embodiment.

FIG. 7a illustrates an example of an apparatus 10 according to an example embodiment. In an example embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, transmission/reception point (TRP) or gNB in 5G. According to some example embodiments, apparatus 10 may represent a service consumer, AMF, SMF, or the like.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources. In certain examples, processor 12 may be configured as a processing means or controlling means for executing any of the procedures described herein.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein. In certain example embodiments, memory 14 may be configured as a storing means for storing any information or instructions for execution as discussed elsewhere herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. In certain example embodiments, transceiver 18 may be configured as a transceiving means for transmitting or receiving information as discussed elsewhere herein. Additionally or alternatively, in some example embodiments, apparatus 10 may include an input and/or output device (I/O device) or means.

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 10 may be a network node or RAN node, such as service consumer, AMF, SMF, or the like. For example, in some example embodiments, apparatus 10 may be configured to perform one or more of the processes depicted in any of the flow charts or signaling diagrams described herein. For instance, apparatus 10 may be configured to perform any of the procedures executed by the AMF/SMF illustrated in FIG. 1 or 4. Further, apparatus 10 may be configured to perform the process illustrated in the example flow diagram of FIG. 5. In some example embodiments, as discussed herein, apparatus 10 may be configured to perform a procedure relating to subscription data management by enhancing shared data, for instance.

According to certain example embodiments, apparatus 10 may be controlled by memory 14 and processor 12 to request individual subscriber data from a service producer, and to receive or retrieve the individual subscriber data from the service producer. For example, in some embodiments, the service producer may include a UDM and/or UDR. According to certain example embodiments, apparatus 10 may be controlled by memory 14 and processor 12 to request shared data from the service producer, and to receive or retrieve the shared data from the service producer. In some example embodiments, the shared data may include one or more treatment attributes configured to define or indicate whether one or more attributes in the shared data should be applied or utilized over one or more conflicting attributes in the individual subscriber data. According to a further example embodiment, the individual subscriber data may additionally or alternatively include one or more treatment attributes configured to define or indicate whether an attribute in the shared data should be applied over a conflicting attribute in the individual subscriber data. Thus, as an example, the treatment attribute(s) may indicate whether a value provided by a shared data attribute takes precedence over a value provided by a corresponding individual subscriber data attribute that may conflict with the shared data attribute. According to an example embodiment, apparatus 10 may also be controlled by memory 14 and processor 12 to determine, using the treatment attribute(s), whether to apply a value provided in the shared data attribute or a value provided in the individual subscriber data attribute. In some example embodiments, apparatus 10 may also be controlled by memory 14 and processor 12 to aggregate data according to the determination of whether to apply the value provided in the shared data attribute or the value provided in the individual subscriber data attribute.

Figure 7B:
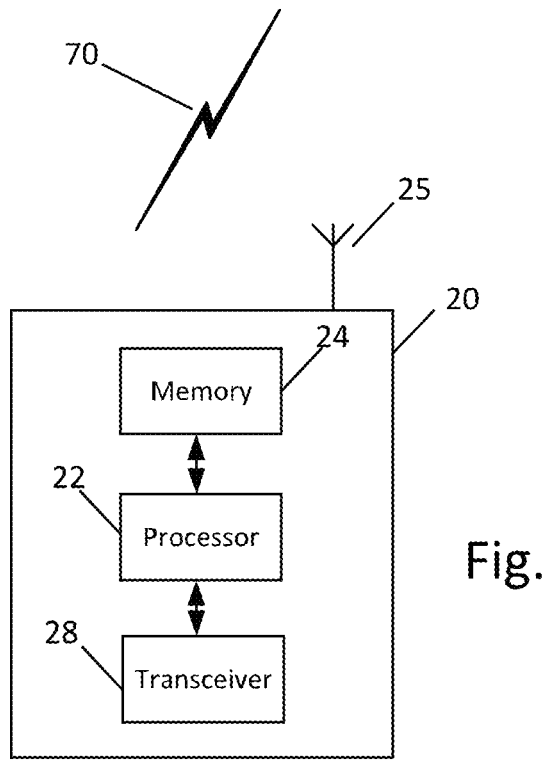
FIG. 7b illustrates an example block diagram of an apparatus, according to an embodiment.

FIG. 7b illustrates an example of an apparatus 20 according to another example embodiment. In an example embodiment, apparatus 20 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 20 may be NG-RAN node, an eNB in LTE, or TRP or gNB in 5G. According to some further example embodiments, apparatus 20 may represent a service producer, UDM or UDR, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 20 may include an input and/or output device (I/O device). In certain example embodiments, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link or interface 70 according to any radio access technology, such as NR.

According to some example embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some example embodiments, apparatus 20 may be network node, a service producer, UDM or UDR, or the like, for example. According to certain example embodiments, apparatus 20 may be controlled by memory 24 and processor 22 to perform the functions associated with example embodiments described herein. For example, in some example embodiments, apparatus 20 may be configured to perform one or more of the processes depicted in any of the flow charts or signaling diagrams described herein, such as those illustrated in FIG. 1, 4 or 6. For instance, in one example embodiment, apparatus 20 may represent the UDM/UDR illustrated in the examples of FIG. 1 or 4. According to an example embodiment, apparatus 20 may be configured to perform a procedure relating to subscription data management by enhancing shared data, for instance.

In certain example embodiments, apparatus 20 may be controlled by memory 24 and processor 22 to receive a request for individual subscriber data from a service consumer, and to provide or transmit the individual subscriber data to the service consumer. For example, in some embodiments, the service consumer may include an AMF and/or SMF. According to certain example embodiments, apparatus 20 may be controlled by memory 24 and processor 22 to receive a request for shared data from the service consumer, and to provide or transmit the shared data to the service consumer. In some example embodiments, the shared data may include one or more treatment attributes configured to define or indicate whether one or more attributes in the shared data should be applied or utilized over one or more conflicting attributes in the individual subscriber data. According to a further example embodiment, the individual subscriber data may additionally or alternatively include one or more treatment attributes configured to define or indicate whether an attribute in the shared data should be applied over a conflicting attribute in the individual subscriber data. In other words, the treatment attribute(s) may indicate whether a value provided by a shared data attribute takes precedence over a value provided by a corresponding individual subscriber data attribute that may conflict with the shared data attribute. According to an example embodiment, the service consumer may then use the treatment attribute(s) to determine whether to apply a value provided in the shared data attribute or a value provided in the individual subscriber data attribute.

In some example embodiments, the shared data may include a treatment attribute provided for each attribute in the shared data. In a further example embodiment, the shared data may include a single treatment attribute as a map that includes, for example, key and treatment value pairs.

According to some example embodiments, the treatment attribute(s) may indicate to overwrite the at least one individual subscriber data attribute with the at least one shared data attribute, to use the at least one shared subscriber data attribute unless it clashes with the at least one individual data attribute, to select a maximum value between the at least one individual subscriber data attribute and the at least one shared data attribute, and/or to select a minimum value between the at least one individual subscriber data attribute and the at least one shared data attribute.

In one example embodiment, when a plurality of shared data is configured, the treatment attribute(s) may be configured to be applied to all of the plurality of shared data. According to an example embodiment, a conflicting attribute in the individual subscriber data takes precedence over the attribute in the shared data unless the treatment attribute(s) indicate otherwise.

Furthermore, it should be noted that an apparatus, according to certain example embodiments, may include means or functions for performing any of the procedures described herein.

Therefore, certain example embodiments provide several technological improvements, enhancements, and/or advantages over existing technological processes and constitute an improvement at least to the technological field of wireless network control and management. For example, as discussed in detail in the foregoing, certain example embodiments provide a process to select the attribute from an individual profile or shared profile dynamically, without the need to update individual subscriber profiles. Example embodiments therefore avoid the need to delete the individual subscriber profile, which is a substantial provisioning operation. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. A method, comprising:
   receiving or retrieving, at a service consumer, shared data from a service producer, wherein the shared data comprises at least one treatment attribute indicating how a potential conflict between individual subscriber data and the shared data will be treated; and
   aggregating the shared data and the individual subscriber data according to a determination of whether to apply a value provided in the shared data or a value provided in the individual subscriber data based on the at least one treatment attribute.

2. The method according to claim 1, wherein the shared data comprises a single treatment attribute as a map comprising key and treatment value pairs.

3. The method according to claim 1, wherein the at least one treatment attribute indicates at least one of:
   to overwrite the at least one individual subscriber data with the at least one shared data;
   to use the at least one shared subscriber data unless it clashes with the at least one individual data;
   to select a maximum value between the at least one individual subscriber data and the at least one shared data; or
   to select a minimum value between the at least one individual subscriber data and the at least one shared data.

4. A method, comprising:
   providing, from a service producer, shared data to a service consumer,
   wherein the shared data comprises at least one treatment attribute indicating how a potential conflict between individual subscriber data and the shared data will be treated.

5. The method according to claim 4, wherein the shared data comprises a single treatment attribute as a map comprising key and treatment value pairs.

6. An apparatus, comprising:
   at least one processor; and
   at least one memory comprising computer program code, the at least one memory and computer program code being configured, with the at least one processor, to cause the apparatus at least to:
   receive or retrieve shared data from a service producer, wherein the shared data comprises at least one treatment attribute indicating how a potential conflict between individual subscriber data and the shared data will be treated; and
   aggregate the shared data and the individual subscriber data according to a determination of whether to apply a value provided in the shared data or a value provided in the individual subscriber data based on the at least one treatment attribute.

7. The apparatus according to claim 6, wherein the shared data comprises a single treatment attribute as a map comprising key and treatment value pairs.

8. The apparatus according to claim 6, wherein the at least one treatment attribute indicates at least one of:

to overwrite the at least one individual subscriber data with the at least one shared data;

to use the at least one shared subscriber data unless it clashes with the at least one individual data;

to select a maximum value between the at least one individual subscriber data and the at least one shared data; or to select a minimum value between the at least one individual subscriber data and the at least one shared data.

9. The apparatus according to claim 6, wherein the individual subscriber data comprises at least one treatment attribute, wherein the at least one treatment attribute in the individual subscriber data is configured to indicate a treatment of the at least one attribute in the shared data over the at least one attribute in the individual subscriber data.

10. The apparatus according to claim 6, wherein, when a plurality of shared data is configured, the at least one treatment attribute is configured to be applied to all of the plurality of shared data.

11. The apparatus according to claim 6, wherein, when the conflict is present, the individual subscriber data takes precedence over the shared data unless the at least one treatment attribute indicates otherwise.

12. The apparatus according to claim 6, wherein the apparatus comprises at least one of: an access and mobility management function (AMF), session management function (SMF), short message service function (SMSF), or other network entity or function; and wherein the service producer comprises at least one of: a unified data manager (UDM) or unified data repository (UDR).

13. An apparatus, comprising:

at least one processor; and at least one memory comprising computer program code, the at least one memory and computer program code being configured, with the at least one processor, to cause the apparatus at least to:

provide shared data to a service consumer, wherein the shared data comprises at least one treatment attribute indicating how a potential conflict between individual subscriber data and the shared data will be treated.

14. The apparatus according to claim 13, wherein the shared data comprises a single treatment attribute as a map comprising key and treatment value pairs.

15. The apparatus according to claim 13, wherein the at least one treatment attribute indicates at least one of:

to overwrite the at least one individual subscriber data with the at least one shared data;

to use the at least one shared subscriber data unless it clashes with the at least one individual data;

to select a maximum value between the at least one individual subscriber data and the at least one shared data; or to select a minimum value between the at least one individual subscriber data and the at least one shared data.

16. A non-transitory computer readable medium comprising program instructions stored thereon which, when executed on a processor, cause the processor to perform at least:

receiving or retrieving, at a service consumer, shared data from a service producer, wherein the shared data comprises at least one treatment attribute indicating how a potential conflict between individual subscriber data and the shared data will be treated; and aggregating the shared data and the individual subscriber data according to a determination of whether to apply a value provided in the shared data or a value provided in the individual subscriber data based on the at least one treatment attribute.

* * * * *